United States Patent Office 3,405,127
Patented Oct. 8, 1968

3,405,127
12,17-DIOXYGENATED STEROIDS
Philip E. Shaw, Bethlehem, N.Y., assignor to Sterling Drug Inc., New York, N.Y., a corporation of Delaware
No Drawing. Filed July 13, 1965, Ser. No. 471,735
20 Claims. (Cl. 260—239.55)

ABSTRACT OF THE DISCLOSURE

The addition of Grignard reagents, R-Mg-halide, to 5β-androstane-3α,12α-diol-17-one provides the unexpected 17α-hydroxy-17-R-isomers. The latter are converted to 3-oxo and 3-oxo-Δ⁴ compounds, and to their 12,17-cyclic ketonide derivatives. Novel derivatives of 5β-androstane-3α,12α,17β-triol are also described. The compounds of the invention modify serum electrolyte content, enhance desoxycorticosterone acetate activity, reverse urinary nitrogen loss, and possess progestational activity.

---

This invention relates to a series of 12α,17-dioxygenated steroids and derivatives thereof.

The addition of Grignard reagents to 17-oxo steroids generally affords the 17β-hydroxy-17α-alkylated derivative as the only product isolated. Surprisingly it has now been found that addition of Grignard reagents, R-Mg-halide, to 5β-androstane-3α,12α-diol-17-one gives significant quantities of the 17α-hydroxy-17β-hydrocarbon-substituted isomer, in some cases a preponderance thereof. This leads to new compounds of the invention having the formula

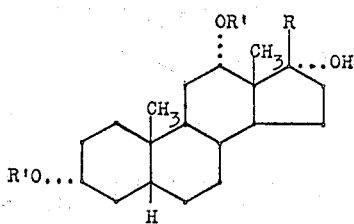

wherein R is lower-alkyl, lower-alkenyl or lower-alkynyl; and R' is hydrogen or carboxylic acyl having up to (and thus including) twelve carbon atoms.

When R in the above Formula I is lower-alkyl it stands for an alkyl group having from one to six carbon atoms, thus including methyl, ethyl, propyl, isopropyl, butyl, hexyl, and the like.

When R in the above Formula I is lower-alkenyl or lower-alkynyl, it stands for an alkenyl or alkynyl group, preferably having from two to six carbon atoms, thus including such groups as allyl, 2-buten-1-yl, ethynyl, 2-propyn-1-yl, 3-hexen-1-yl, 2-hexyn-1-yl, and the like.

The compounds of Formula I wherein R' is carboxylic acyl having up to twelve carbon atoms are prepared from the 3α,12α-dihydroxy compounds by conventional esterification reactions.

The term lower-carboxylic acyl having up to (and therefore including) twelve carbon atoms refers to acyl radicals derived from carboxylic acids having up to (and therefore including) twelve carbon atoms and a molecular weight less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can have from one to four carbon atoms.

Compounds of Formula I wherein R is lower-alkyl of two or more carbon atoms can be alternatively produced by catalytic hydrogenation of the corresponding compounds wherein R is lower-alkenyl or lower-alkynyl. Partial hydrogenation of compounds wherein R is lower-alkynyl affords the corresponding compounds wherein R is lower-alkenyl.

The compounds of Formula I and their isomers having the 17α-R-17β-hydroxy configuration are readily converted by oxidation and dehydrogenation reactions to further compounds of the invention having the formulas

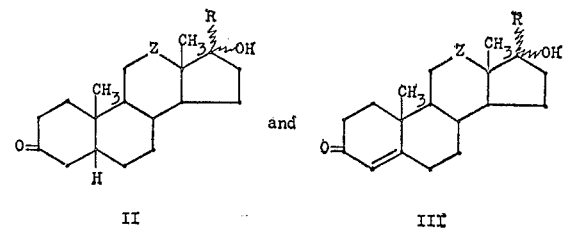

wherein R is lower-alkyl, lower-alkenyl or lower-alkynyl; and Z is CH(α-OH), CH(α-OAcyl) or C=O, Acyl being carboxylic acyl having up to twelve carbon atoms. The various terms have the same meanings as given hereinabove.

The 3-oxo group in compounds of Formula II is formed by oxidation of the corresponding 3-hydroxy compounds, as with chromic oxide or N-bromoacetamide. The 3-oxo-Δ⁴ structure of compounds of Formula III is produced from compounds of Formula II by bromination at C–4 and dehydrobromination with an organic base or with lithium halide and lithium carbonate.

The configuration at C–17 in the Grignard products derived from 5β-androstane-3α,12α-diol-17-one was determined by preparation of the corresponding 3α,12α-diacetates of each epimer followed by hydrolysis of each diacetate in aqueous methanolic potassium hydroxide at reflux temperature for 30 minutes. The 17α-R derivative was only partially hydrolyzed to the 12α-monoacetate whereas the 17β-R derivative was completely hydrolyzed to the 3α,12α,17α-triol. The 17α-hydroxyl group bears a 1,3-diaxial relationship to the 12α-substituent and thus can assist in its hydrolysis.

Further evidence of the configurations assigned to the 17-substituents in the Grignard products was obtained by treating each isomer under acetonide formation conditions, for example with acetone containing a trace of a strong acid such as perchloric acid. Only one isomer formed an acetonide. This isomer must be the 17β-R-17α-hydroxy isomer, because examination of molecular models revealed that the steric arrangement of the 12α- and 17β-hydroxy groups would prohibit acetonide formation. Such ketal formation leads to another aspect of the invention which relates to compounds having the formulas

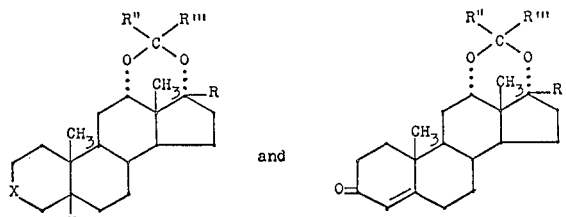

IV and V where X is CH(α-OH), CH(α-OAcyl) or C=O, Acyl being carboxylic acyl having up to twelve carbon atoms; R is lower-alkyl, lower-alkenyl or lower-alkynyl; and R'' and R''' are lower-alkyl. The groups defining R have the same meanings given hereinabove; and the lower-alkyl groups R'' and R''' can have from one to six carbon atoms.

The compounds of Formulas IV and V are prepared from compounds of Formula I and from compounds of Formulas II and III having the 17β-R-17α-hydroxy configuration by reacting them with lower-aliphatic ketones, R''COR''', in the presence of a strong acid, e.g., perchloric acid, p-toluenesulfonic acid, sulfosalicylic acid, hydrochloric acid or the like.

A further aspect of the invention resides in ketal derivatives in the pregnane series having the formula

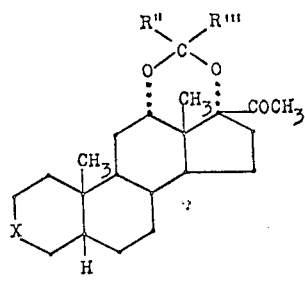

VI wherein X, R'' and R''' have the same meanings given hereinabove in connection with Formulas IV and V.

The compounds of Formula VI are prepared as follows from the known 3α,12α-dihydroxy-5β-pregnan-20-one. The latter when treated with oxygen is tertiary-butyl alcohol containing potassium tertiary-butoxide is converted to 17a-hydroperoxy-3α,12α-dihydroxy-5β-pregnan-20-one, which when reduced with zinc dust in acetic acid affords 3α,12α,17α-trihydroxy-5β-pregnan-20-one. The latter can then be converted to a ketal derivative VI by reacting it with a ketone R''COR''' in the presence of a strong acid. Esterification or oxidation of the C-3 hydroxy group can be effected either before or after ketalization.

A further aspect of the invention is concerned with compounds of the formula

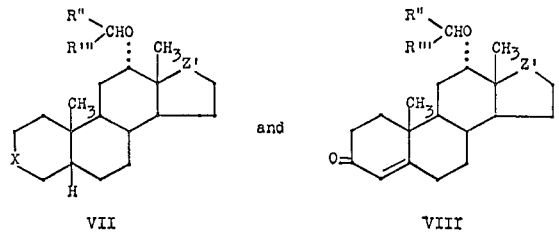

VII and VIII wherein X is CH(α-OH), CH(α-OAcyl) or C=O; Z' is CH(β-OH), CH(β-OAcyl) or C=O; and R'' and R''' are lower-alkyl; Acyl in each instance being carboxylic acyl having up to (and thus including) twelve carbon atoms. The lower-alkyl group R'' and R''' can have from one to six carbon atoms.

The compounds of Formulas VII and VIII can be prepared from 5β-androstane-3α,12α,17β-triol. The latter compound does not form a 12,17-ketal with a ketone, R''COR''', because of the β-configuration of the 17-hydroxy group. However, it has surprisingly been found that said compound does react with a ketone R''COR''' in the presence of a strong acid catalyst, for example, perchloric acid or boron trifluoride, to give a compound of the formula

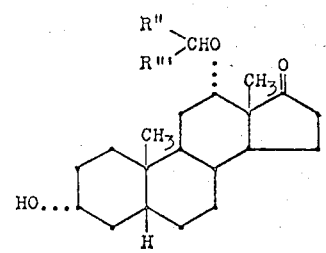

IX

The reaction takes place readily at room temperature.

The compounds of Formula IX are within the scope of Formula VII where X is CH(α-OH) and Z' is C=O, and the former are readily converted to the remaining compounds within the scope of Formula VI by conventional oxidation, reduction and esterification reactions, operating upon the 3- and/or 17-positions. The compounds of Formula VIII are prepared from the compounds of Formula VII where X is C=O by bromination in the 4-position, followed by dehydrobromination with an organic base or with lithium salts to form the 4,5-double bond.

Still another aspect of the invention is concerned with compounds of the formula

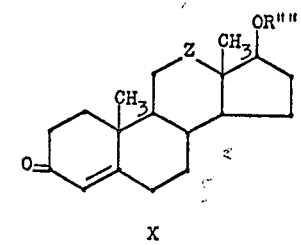

X wherein R'''' is hydrogen or carboxylic acyl having up to twelve carbon atoms; and Z is CH(α-OH), CH(α-OAcyl) or C=O, Acyl being carboxylic acyl having up to (and thus including) twelve carbon atoms.

The compounds of Formula VIII wherein Z' is C=O when treated with a strong acid are converted to 4-androstene-12α,17β-diol-3-one [X, R'''' is H, Z is CH(α-OH)]. Any strong acid, for example, hydrochloric, sulfuric, perchloric, p-toluenesulfonic, sulfosalicylic or trifluoroacetic acids, can be employed, and the reaction takes place at room temperature. In the event that trifluoroacetic acid is used, esterification of the 17-hydroxy group takes place, and 17β-trifluoroacetoxy-4-androsten-12α-ol-3-one [X, R'''' is COCF₃, Z is CH(α-OH)] is produced. Other compounds within the scope of Formula X are prepared by conventional oxidation and/or esterification reactions and illustrated in the examples below.

Endocrinological evaluation of compounds of Formulas I, II, III, IV, V and VI has demonstrated that they possess useful hormonal properties, for example, modification of serum electrolyte content, enhancement of desoxycorticosterone acetate activity, reversal of urinary nitrogen loss, and progestational activity. Effective dose levels are from 10 to 50 mg./kg. and they can be formulated and administered to animal organisms in the same manner as other steroidal hormones.

The compounds of Formulas VII, VIII and X are useful as intermediates in preparing known steroids, including 11-dehydrotestosterone and derivatives and analogs thereof, known to be useful as anabolic and androgenic agents [Meystre et al., Helv. Chim. Acta 32, 1978 (1949)]. For example, 17β-trifluoroacetoxy-4-androsten-12α-ol-3-one [X, R'''' is COCF$_3$, Z is CH(α-OH)] (prepared from compounds of Formula VIII, in turn prepared from compounds of Formula VII) can be reacted with p-toluenesulfonyl chloride in pyridine to give the 12α-p-toluenesulfonate, and the latter heated with potassium tertiary-butoxide in dimethyl sulfoxide solution to afford 11-dehydrotestosterone.

The following examples will further illustrate the invention without the latter being limited thereby (melting points are corrected unless otherwise stated. Except as noted, specific rotations wree measured in chloroform (1% solution) at 25° C. and ultraviolet spectra in 95% ethanol).

EXAMPLE 1

Grignard reaction of methylmagnesium bromide with 3α,12α-dihydroxy-5β-androstan-17-one A solution of 10.36 g. (34.1 mmoles) of 3α,12α-dihydroxy-5β-androstan-17-one in 500 ml. of tetrahydrofuran was stirred magnetically as 400 ml. of a 3 M methylmagnesium bromide solution in ether was added dropwise in 30 minutes. The resulting solution was refluxed for 36 hours and then cooled to room temperature. The complex was decomposed by adding 400 ml. of saturated ammonium chloride solution. More ether and water were added and the layers were separate. The aqueous layer was extracted with two portions of ether and the combined organic layer was washed with saturated salt solution and dried over powdered magnesium sulfate, then concentrated to dryness. The residue was recrystallized from acetone to give 4.5 g. of material having M.P. 217–222° C. Concentration of the mother liquor afforded 7.1 g. of a viscous brown oil. The crystalline portion of the product upon two further recrystallizations from acetone afforded 2.25 g. of 17α-methyl-5β-androstane - 3α,12α,17β - triol, M.P. 224–228° C. Concentration of the combined mother liquor from the last two recrystallizations afforded an additional 1.27 g., M.P. 220–224° C. (32% yield for the two crops). One recrystallization of the first crop from ethyl acetate afforded a sample with M.P. 225–228° C., [α]$_D$ +48.2° (1% in ethanol).

The 7.1 g. of brown oil was recycled by dissolving it in 350 ml. of tetrahydrofuran and refluxing for 72 hours with 275 ml. of methylmagnesium bromide solution following the above procedure. The product was an oil which was combined with the residue from the mother liquor of the second crop of 17α-methyl-5β-androstane-3α,12α,17β-triol, and the resulting 7.6 g. of residue was acetylated with acetic anhydride and pyridine at room temperature. The product (about 10 g. of oil) was taken up in 30% ether-70% pentane and chromatographed on 300 g. of silica gel. Elution with 50% ether-50% pentane and 80% ether-20% pentane solvent mixtures afforded crystalline material which was combined and recrystallized from acetone-hexane to give 2.0 g. of 17α-methyl-5β-androstane-3α,12α,17β-triol 3,12-diacetate, M.P. 166–168° C. One recrystallization from acetone-hexane afforded a sample with M.P. 166–168° C., [α]$_D$ +101.2°.

Early chromatograph fractions eluted with 50% ether-50% pentane which were non-crystalline were combined with the residue obtained upon concentration of the mother liquor from the crystallization of the above diacetate, and the resulting 5.5 g. of oil was hydrolyzed by refluxing it for 30 minutes with 4.4 g. of potassium hydroxide and 11 ml. of water in 225 ml. of methanol. The reaction mixture was treated with 5 ml. of acetic acid and the bulk of the methanol was removed by warming in vacuo. Ether (500 ml.) was added followed by the minimum amount of water needed to dissolve all ether-insoluble material. The layers were separated and the organic layer was washed with salt solution and dried over powdered magnesium sulfate. Evaporation to dryness afforded a white, crystalline residue which was recrystallized from methylene dichloride-ether to give 1.5 g. of 17β-methyl-5β-androstane-3α,12α,17α-triol [I; R is CH$_3$, R' is H], M.P. 207–214° C. The purified sample was prepared by recrystallization from methylene dichloride-acetone, M.P. 210–214° C., [α]$_D$ +29.2° (1% in ethanol).

EXAMPLE 2

17β - methyl-5β-androstane-3α,12α,17α-triol 3,12-diacetate [I; R is CH$_3$, R' is COCH$_3$] was prepared from 17β-methyl-5β-androstane-3α,12α,17α-triol and acetic anhydride in pyridine, and recrystallized from ether-pentane, M.P. 121–124° C., [α]$_D$ +108.4°.

Other esters can be prepared by replacing the acetic anhydride by other acid anhydrides or acid halides, for example, propionic anhydride, caproyl chloride, dodecanoyl chloride, β-cyclohexylpropionyl chloride, benzoyl chloride, p-nitrobenzoyl chloride, phenylacetyl chloride, cinnamoyl chloride, p-chlorophenoxyacetyl chloride or nicotinoyl chloride, which produce, respectively, the 3,12-dipropionate, 3,12-dicaproate, 3,12-didodecanoate, 3,12-di-(β-cyclohexylpropionate), 3,12-dibenzoate, 3,12-di-(p-nitrobenzoate), 3,12-di-(phenylacetate), 3,12-dicinnamate, 3,12-di-(p-chlorophenoxyacetate), or 3,12-dinicotinoate of 17β-methyl-5β-androstane-3α,12α,17α-triol.

EXAMPLE 3

(a) 17αmethyl-5β-androstane-3α,12α,17β-triol 12-acetate

To 16.0 g. (39.3 mmoles) of 17α-methyl-5β-androstane-3α,12α,17β-triol, 3,12-diacetate in 650 ml. of methanol was added 32 ml. of 30% aqueous potassium hydroxide and the resulting solution refluxed for 30 minutes. The reaction mixture was acidified with acetic acid (15 ml.) and the bulk of the methanol removed in vacuo at <45° C. Ether and methylene dichloride were added and the organic solution washed with saturated salt solution and dried over powdered magnesium sulfate, then concentrated to dryness. The residue was crystallized from ether to produce 13.0 g. (90% yield) of 17α-methyl-5β-androstane-3α,12α,17β-triol 12-acetate as a solvate, M.P. 118–122° C. (bubbling). A portion of this material was further purified by chromatography on silica gel and then recrystallized from ethyl acetate to furnish a sample with M.P. 162.5–163° C., [α]$_D$ +74.4°.

(b) 12α,17β-dihydroxy-17α-methyl-5β-androstan-3-one 12-acetate [II; R is α-CH$_3$, Z is CH(α-OCOCH$_3$)]

A solution of 9.50 g. (25.9 mmoles) of 17α-methyl-5β-androstane-3α,12α,17β-triol 12-acetate in 150 ml. of acetone was treated with 38 ml. of water and 10.5 g. of N-bromoacetamide. The resulting solution was kept in the dark at 5° C. for 2 hours and then poured into 300 ml. of water containing 20 g. of sodium sulfite. The mixture was extracted with four portions of ether and the combined extracts washed with water and saturated salt solution and dried over powdered magnesium sulfate, then concentrated to dryness. The oily residue was crystallized from acetone-hexane, affording 4.85 g. of 12α,17β-dihydroxy - 17α - methyl-5β-androstan-3-one 12-acetate, M.P. 127–128.5° C. Concentration of the mother liquor afforded a second crop of 2.0 g. of product (73% total yield), M.P. 121–129° C. One recrystallization of the first crop from acetone-hexane afforded a sample with the melting point unchanged, [α]$_D$ +82.5°.

EXAMPLE 4

12α,17β-dihydroxy-17α-methyl-5β-androstan-3-one [II; R is α-CH$_3$, Z is CH(α-OH)]

A mixture of 6.3 g. of 12α,17β-dihydroxy-17α-methyl-5β-androstan-3-one 12-acetate (Example 3) and 15.0 g. of potassium hydroxide in 220 ml. of methanol was refluxed for four and one-half hours. The product was isolated and recrystallized from acetone-hexane to give 3.0 g. of 12α,17β-dihydroxy-17α-methyl-5β-androstan-3-one, prisms, M.P. 174–176° C., $[\alpha]_D$ +35.3°.

EXAMPLE 5

12α,17β-dihydroxy-17α-methylandrost-4-en-3-one 12-acetate [III; R is α-CH₃, Z is CH(α-OCOCH₃)]

To a stirred solution of 4.46 g. (12.3 mmoles) of 12α,17β-dihydroxy-17α-methyl-5β-androstan-3-one 12 - acetate (Example 3) in 45 ml. of acetic acid containing one drop of 30% hydrogen bromide in acetic acid was added dropwise a solution of 1.96 g. (12.3 mmoles) of bromine and 0.95 g. (11.6 mmoles) of fused sodium acetate in 85 ml. of acetic acid. The reaction mixture was at once poured into water and the aqueous mixture extracted with two portions of ether. The ether extracts were combined and washed with 10% sodium carbonate and water and dried over powdered magnesium sulfate, then concentrated to dryness to give 5.1 g. of 4β-bromo derivative as a clear colorless oil. Without further purification, this oil was dissolved in 55 ml. of dimethylformamide and 3.36 g. of lithium carbonate and 3.82 g. of lithium bromide were added. The resulting suspension was stirred magnetically and heated on a steam bath for 16 hours. To the cooled reaction mixture were added 1 liter of ether and 250 ml. of 1 N hydrochloric acid and the layers were separated. The ether layer was washed with saturated sodium bicarbonate solution, water and saturated salt solution and dried over powdered magnesium sulfate, then evaporated to dryness. Crystallization of the residue from acetone-hexane afforded 1.80 g. (40% yield) of 12α,17β-dihydroxy-17α-methylandrost-4-en - 3 - one 12 - acetate, M.P. 179–183° C. Two recrystallizations from the same solvent mixture gave a sample with M.P. 186.5–188.5° C., $[\alpha]_D$ +157.2°, $\lambda_{max}$. 240 m$\mu$ ($\epsilon$ 15,700).

EXAMPLE 6

12α,17β-dihydroxy-17α-methylandrost-4-en-3-one [III; R is α-CH₃, Z is CH(α-OH)]

A solution of 1.00 g. (2.77 mmoles) of 12α,17β-dihydroxy-17α-methylandrost-4-en-3-one 12-acetate (Example 5) and 2.38 g. of potassium hydroxide in 35 ml. of methanol was refluxed for 4.5 hours under nitrogen. The reaction mixture was acidified with acetic acid and the methanol was removed by concentration in vacuo at <45° C. To the residue were added 300 ml. of ether and the minimum amount of water (10–20 ml.) necessary to dissolve the solid residue completely. The layers were separated and the ether layer was washed with saturated salt solution and dried over powdered magnesium sulfate and decolorized with charcoal, then concentrated to give a pale yellow crystalline residue. Recrystallization from acetone-hexane afforded 0.67 g. (76% yield) of 12α,17β-dihydroxy-17α-methylandrost-4-en-3-one, M.P. 192–194° C. One recrystallization from the same solvent mixture furnished a sample with M.P. 193–194.5° C., $[\alpha]_D$ +109.2°; $\lambda_{max}$ 242 m$\mu$ ($\epsilon$ 15,700).

EXAMPLE 7

17β-allyl-5β-androstane-3α,12α,17α-triol
[I; R is CH₂CH=CH₂, R' is H]

A solution of 6.5 ml. of allyl bromide in 65 ml. of absolute ether was added to 6.5 g. of magnesium turnings and the mixture allowed to stand until considerable cloudiness had developed (about 5 minutes). The liquid was removed by decanting and 125 ml. of anhydrous ether was added to the etched magnesium, thus prepared. To the vigorously stirred mixture was added dropwise in 75 minutes a solution of 6.5 g. (21 mmoles) of 3α,12α-dihydroxy-5β-androstan-17-one and 15.5 ml. (180 mmoles) of allyl bromide in 40 ml. of tetrahydrofuran and 175 ml. of anhydrous ether. Every 20 minutes during the dropwise addition, 2 g. portions of magnesium were added. At the end of the addition, the reaction mixture was refluxed for 4 hours. More ether (150 ml.) and 250 ml. of methylene dichloride were added and the complex was decomposed by the addition of 300 ml. of saturated ammonium chloride solution. The layers were separated and the organic layer was washed with salt solution and dried over powdered magnesium sulfate, then concentrated to dryness. Recrystallization of the residue from acetone afforded 5.50 g. of 17β-allyl-5β-androstane-3α,12α,17α-triol, M.P. 217–219° C. Concentration of the mother liquor gave 0.60 g. of material, M.P. 207–214° C., which, upon recrystallization from acetone, furnished an additional 0.50 g. (total yield 81%), M.P. 216–218° C. A sample prepared by recrystallization from acetone had the M.P. 219–220° C. $[\alpha]_D$+36.2°.

By replacing the allyl bromide in the foregoing preparation by a molar equivalent amount of propargyl bromide, there can be obtained 17β-propargyl-5β-androstane-3α,12α,17α-triol [I; R is CH₂C≡CH, R' is H].

EXAMPLE 8

17β-allyl-5β-androstane-3α,12α,17α-triol 3,12-diacetate [I; R is CH₂CH=CH₂, R' is COCH₃] was prepared from 17β-allyl-5β-androstane-3α,12α,17α-triol (Example 7) and acetic anhydride in pyridine, and had the M.P. 97–98.5° C., $[\alpha]_D$+107.2°.

EXAMPLE 9

17β-propyl-5β-androstane-3α,12α,17α-triol
[I; R is CH₂CH₂CH₃, R' is H]

To a solution of 10.0 g. (28.7 mmoles) of 17β-allyl-5β-androstane-3α,12α,17α-triol (Example 7) in 300 ml. of 95% ethanol was added 1.0 g. of 10% palladium on carbon and the mixture was shaken at room temperature with hydrogen at 55 p.s.i. Hydrogen uptake ceased after one molar equivalent was absorbed (5 minutes). The catalyst was removed by filtration through filtercel, and the filtrate was concentrated to dryness by warming in vacuo. Recrystallization of the residue from acetone afforded 7.3 g. of 17β-propyl-5β-androstane-3α,12α,17α-triol, M.P. 205–207° C. A second crop of 1.8 g. (90% yield), M.P. 202–205° C., was obtained from the mother liquor. One recrystallization of the first crop material from acetone afforded a sample with the melting point unchanged, $[\alpha]_D$+18.3°.

EXAMPLE 10

17β-propyl-5β-androstane-3α,12α,17α-triol 3,12-diacetate [I; R is CH₂CH₂CH₃, R' is OCOCH₃] was prepared from 17β - propyl-5β-androstane-3α,12α,17α-triol (Example 9) and acetic anhydride in pyridine. The product was recrystallized from methanol and had the M.P. 144–146° C., $[\alpha]_D$+108.2°.

EXAMPLE 11

17β-propyl-12α,17α-dihydroxy-5β-androstan-3-one
[II; R is β-CH₂CH₂CH₃, Z is CH(α-OH)]

A solution of 6.6 g. (19 mmoles) of 17β-propyl-5β-androstane-3α,12α,17α-triol (Example 9) in 130 ml. of t-butanol was treated with 5 ml. of pyridine, 5 ml. of water and 3.2 g. (1.25 equiv.) of N-bromoacetamide, and the resulting solution kept for 7 hours at room temperature. The reaction mixture was poured into 1.5 liters of cold water containing 6 g. of sodium sulfite, and the precipitate which formed was collected and dried and recrystallized from methanol to give 3.0 g. (46% yield) of 17β - propyl-12α,17α-dihydroxy-5β-androstan-3-one, M.P. 211–212° C. One recrystallization from methanol furnished a sample with M.P. 215–216° C., $[\alpha]_D$+14.3°, $\lambda_{max}$3.10, 5.85$\mu$.

EXAMPLE 12

17β-propyl-12α,17α-dihydroxy-5β-androstan-3-one 12-acetate [II; R is β-CH₂CH₂CH₃, Z is CH(αOCOCH₃)]

was prepared from 17β-propyl-12α,17α-dihydroxy-5β-androstan-3-one (Example 11) and acetic anhydride in pyridine, and purified by recrystallization from acetone-hexane. It had the M.P. 126–128° C., [α]$_D$ +83.3°, λ$_{max}$ 2.80, 5.81, 7.94μ.

EXAMPLE 13

17β-propyl-17α-hydroxy-5β-androstane-3,12-dione
[II; R is β-CH$_2$CH$_2$CH$_3$, Z is C=O]

To the chromium trioxide-pyridine complex prepared by adding 5.8 g. of chromium trioxide to 60 ml. of pyridine was added a solution of 2.9 g. (8.3 mmoles) of 17β-propyl-5β-androstane-3α,12α,17α-triol (Example 9) in 20 ml. of pyridine and the resulting mixture stirred magnetically for 20 hours at room temperature. The reaction mixture was diluted with hot benzene and filtered through filtercel and the filter cake rinsed with two portions of hot benzene. The combined filtrate was diluted with ether and washed successively with water, 2 N hydrochloric acid, 2 N sodium hydroxide, water and saturated salt solution and dried over powdered magnesium sulfate, then concentrated to dryness. Recrystallization of the residue from acetone-hexane afforded 1.8 g. (63% yield) of 17β - propyl - 17α - hydroxy-5β-androstane-3,12-dione, M.P. 159–160° C. One recrystallization from the same solvent mixture gave a sample with M.P. 160–162° C., [α]$_D$ +46.1° (1% in acetone); λ$_{max}$ 2.85, 5.77, 5.93μ.

$$\lambda^{CHCl_3}_{max.} 5.83, 5.91\mu$$

EXAMPLE 14

17β-allyl-17α-hydroxy-5β-androstane-3,12-dione
[II; R is β-CH$_2$CH=CH$_2$, Z is C=O]

To the chromium trioxide-pyridine complex prepared by adding 9 g. of chromium trioxide to 90 ml. of pyridine was added a solution of 4.5 g. (13 mmoles) of 17β-allyl-5β-androstane-3α,12α,17α-triol (Example 7) in 30 ml. of pyridine and the mixture stirred magnetically at room temperature for 24 hours. The reaction mixture was diluted with 350 ml. of hot benzene, filtered through filtercel and the filter cake washed with two portions of hot benzene. The filtrate was diluted with ether and washed successively with water, 2 N hydrochloric acid, water and saturated salt solution and dried over powdered magnesium sulfate, decolorized with charcoal and then concenrated to a white crystalline residue. Recrystallization from acetone-hexane afforded 2.4 g. (54% yield) of 17β-allyl-17α-hydroxy-5β-androstane - 3,12 - dione, M.P. 156–158° C. A second recrystallization from acetone-hexane produced a sample with the melting point unchanged, [α]$_D$ +31.8°, λ$_{max}$ 2.84, 3.28, 5.77, 5.93, 6.09μ.

By the same procedure 17β-propargyl-5β-androstane-3α,12α,17α-triol can be oxidized to 17β-propargyl-17α-hydroxy-5β-androstane-3,12-dione [II; R is β-CH$_2$≡CH; Z is C=O].

EXAMPLE 15

12α-17α-isopropylidenedioxy - 17α - methyl-5β-androstan-3α-lo [IV; R is CH$_3$, R″ and R‴ are CH$_3$, X is CH(α-OH)]

A solution of 3.65 g. (11.3 mmoles) of 17β-methyl-5β-androstane-3α,12α,17α-triol (Example 1) in 440 ml. of acetone containing 20 drops of 72% perchloric acid was kept for 3.5 hours at room temperature. The reaction mixture was treated with 220 ml. of water and then sufficient saturated sodium bicarbonate solution (about 15 ml.) was added to neutralize the acid present. The acetone was removed by concentration in vacuo at <50° C. and the aqueous residue was extracted twice with ether. The ether extracts were combined and washed with saturated salt solution and dried over powdered magnesium sulfate, then concentrated to dryness. The residue was taken up in 1:9 methylene dichloride-ether and poured onto a column containing 120 g. of silica gel. The first 1000 ml. of eluate afforded crystalline material which was recrystallized from ether-pentane to give 1.8 g. (44% yield) of 12α,17α-isopropylidenedioxy-17β-methyl-5β-androstan-3α-ol, M.P. 166–169° C. Two recrystallization from the same solvent mixture afforded a sample with M.P. 168.5–170° C., [α]$_D$ +13.6°.

By replacing the acetone in the foregoing preparation by a molar equivalent amount of methyl ethyl ketone, diethyl ketone or dibutyl ketone, there can be obtained, respectively, 12α,17α-(2′-butylidenedioxy)-17β-methyl-5β-androstan-3α-ol [IV; R is CH$_3$, R″ is C$_2$H$_5$, R‴ is CH$_3$, X is CH(α-OH)], 12α,17α - (3′ - pentylidenedioxy) - 17β-methyl-5β-androstan-3a-ol [IV; R is CR$_3$, R″ and R‴ are C$_2$H$_5$, X is (CH(α-OH)], or 12α,17α - (5′ - nonylidenedioxy)-17β-methyl-5β-androstan-3α-ol [IV; R is CH$_3$, R″ and R‴ are C$_4$H$_9$, X is CH(α-OH)].

In another run there was isolated from the chromatograph column a byproduct consisting of 17-methyl-5β-androst-16-ene-3α-12α-diol which was treated with acetic anhydride in pyridine to give 17-methyl-5β-androst-16-ene-3α,12α-diol 3,12-diacetate, M.P. 143–146° C. when recrystallized from methanol, [α]$_D$ +110.9°. The latter compound was found to have myotrophic activity.

EXAMPLE 16

12α,17α - isopropylidenedioxy - 17β-methyl-5β-androstan-3α-ol 3-acetate [IV; R is CH$_3$, R″ and R‴ are CH$_3$, X is CH(α-OCOCH$_3$)] was prepared from 1.5 g. of 12α,17α-isopropylidenedioxy-17β-methyl-5β-androstan - 3α-ol and 7.5 ml. of acetic anhydride in 15 ml. of pyridine 16 hours at room temperature. The product was isolated and recrystallized from acetonitrile to give 12α,17α-isopropylidenedioxy-17β-methyl-5β-androstan-3α - ol 3 - acetate, M.P. 122.5–124.5° C., [α]$_D$ +30.0°.

EXAMPLE 17

12α,17α-isopropylidenedioxy - 17β - methyl - 5β - androstan-3-one [IV; R is CH$_3$, R″ and R‴ are CH$_3$, X is C=O]

A solution of 0.15 g. (0.41 mmole) of 12α,17α-isopropylidenedioxy-17β-methyl-5β-androstan-3α-ol (Example 15), 0.17 g. (1.2 mmoles) of N-bromoacetamide, 1 ml. of pyridine, 1 ml. of water and 10 ml. of t-butyl alcohol was allowed to stand overnight at room temperature in the dark and then poured into 25 ml. of water containing 0.25 g. of sodium sulfite. The aqueous mixture was extracted with 4 portions of ether and the combined ether extracts were washed with saturated salt solution and dried over powdered magesium sulfate, then concentrated to dryness. The residue was recrystallized from ether-pentane to give 92 mg. (62% yield) of 12α,17α-isopropylidenedioxy-17β-methyl-5β-androstan-3-one, M.P. 164–168° C. A purified sample was prepared by recrystallization from ether-pentane, M.P. 162.5–165° C., [α]$_D$ +13.1°, λ$_{max}$ 5.86μ.

EXAMPLE 18

12α,17α-isopropylidenedioxy-17β-methylandrost-4-en-3-one [V; R is CH$_3$, R″ and R‴ are CH$_3$]

To a solution of 2.95 g. (8.2 mmoles) of 12α,17α-isopropylidenedioxy-17β-methyl-5β-androstan-3-one (Example 17) in 60 ml. of dimethylformamide containing 0.03 g. of p-toluene-sulfonic acid was added in one portion a solution of 1.31 g. (8.2 mmoles) of bromine in 15 ml. of dimethylformamide. The reaction mixture was kept for 2.5 hours at room temperature, and during this period the solution gradually lightened in color until it became almost colorless. It was poured into 75 ml. of saturated sodium bicarbonate solution in 750 ml. of water and the aqueous mixture extracted with two portions of ether. The extracts were combined, washed with saturated salt solution and dried over powdered magnesium sulfate, then concentrated to dryness, affording the 4-bromo derivative as a white crystalline solid, M.P. 135–144° C. A 0.10 g. portion of this solid was recrystallized twice from acetonitrile to give a small amount of material melting at 167–169° C., $\lambda_{max}$ 5.79µ.

The bulk of the crude bromo ketone was dehydrobrominated without further purification by dissolving it in 60 ml. of dimethylformamide, adding 3.0 g. of lithium carbonate and 3.2 g. of lithium bromide and heating the mixture for 18 hours on a steam bath with magnetic stirring. The reaction mixture was cooled and poured into water, then extracted with two portions of ether. The extracts were combined and washed with water and salt solution and dried over powdered magnesium sulfate, then concentrated to a small volume and cooled. The precipitate was collected and dried to furnish 1.33 g. (45% yields) of 12α,17α-isopropylidenedioxy-17β-methylandrost-4-en-3-one, M.P. 200–207° C. One recrystallization from methanol afforded a sample with M.P. 207–210° C., $[\alpha]_D$ +52.4°, $\lambda_{max}$ 241 mµ (ϵ 16,300).

12α,17α - (2' - butylidenedioxy)-17β-methyl-5β-androstan-3α-ol; 12α,17α-(3'-pentylidenedioxy)-17β-methyl-5β-androstan-3α-ol; or 12α,17α-(5'nonylidenedioxy)-17β-methyl-5β-androstan-3α-ol when subjected to the procedures of Examples 17 and 18 can be converted, respectively, to 12α,17α-(2'-butylidenedioxy)-17β-methylandrost-4-en-3-one [V; R is $CH_3$, R" is $C_2H_5$, R''' is $CH_3$]; 12α,17α-(3' - pentylidenedioxy)-17β-methylandrost-4-en-3-one [V; R is $CH_3$, R" and R''' are $C_2H_5$]; or 12α,17α-(5'-nonylidenedioxy)-17β-methylandrost-4-en-3-one [V; R is $CH_3$, R" and R''' are $C_4H_9$].

EXAMPLE 19

12α,17α-dihydroxy-17-methylandrost-4-en-3-one [III; R is β-$CH_3$, Z is CH(α-OH)]

A solution of 1.05 g. of 12α,17α-isopropylidenedioxy-17β-methylandrost-4-en-3-one in 30 ml. of acetic acid was treated with 10 ml. of water, and the mixture was allowed to stand at room temperature for two and one-half hours. The mixture was diluted with water and after an additional 30 minutes the solution was treated with saturated sodium bicarbonate solution until alkaline and then extracted with ether. The ether extracts were washed with water and sodium chloride solution, dried and concentrated to dryness. The residue was recrystallized from acetone-hexane and from acetonitrile to give 12α,17α-dihydroxy-17-methylandrost-4-en-3-one, M.P. 199.5-203° C., $[\alpha]_D$ +84.4°.

EXAMPLE 20

17β - allyl - 12α,17α-isopropylidenedioxy-5β-androstan-3α-ol acetate [IV; R is $CH_2CH=CH_2$, R" and R''' are $CH_3$, X is CH(α-OCOCH_3)]

A suspension of 4.3 g. (12 mmoles) of 17β-allyl-5β-androstane-3α,12α,17α-triol (Example 7) in 430 ml. of acetone was stirred magnetically as 10 drops of 70% perchloric acid was added. After the mixture had stirred for 10 minutes, all material was in solution and an amber color had developed. The solution was kept for 3 hours at room temperature and then 200 ml. of water and 20 ml. of saturated sodium bicarbonate solution were added. The acetone was removed by warming in vacuo and the aqueous residue was extracted with two portions of ether. The extracts were combined and washed with saturated salt solution and dried over powdered magnesium sulfate, then concentrated to dryness. The pale-yellow oily residue was purified by chromatography on neutral alumina. Elution with 10% methylene dichloride-50% ether-40% pentane afforded 3.70 g. of 17β-allyl-12α,17α-isopropylidenedioxy-5β-androstan-3α-ol as an oil which resisted all attempts at crystallization; $\lambda_{max}$ 3.00, 3.31, 6.14, 7.26, 7.31µ. The 3.70 g. of amorphous hydroxy compound was acetylated with acetic anhydride and pyridine and the product purified by chromatography on neutral alumina. Elution with 10% ether-90% pentane afforded crystalline material which was recrystallized from pentane to give 2.2 g. of 17β-allyl-12α,17α-isopropylidenedioxy-5β-androstan-3α- ol acetate, M.P. 134–137° C. A second recrystallization from pentane furnished a sample with M.P. 136.5–138° C., $[\alpha]_D$ +11.0°, $\lambda_{max}$ 3.25, 5.74, 6.11, 7.23, 7.30, 8.00µ.

By replacing the 17β-allyl-5β-androstane-3α,12α,17α-triol in the foregoing preparation by a molar equivalent amount of 17β-propargyl-5β-androstane-3α,12α,17α-triol there can be obtained 17β-propargyl-12α,17α-isopropylidenedioxy-5β-androstan-3α-ol and its acetate [IV; R is $CH_2C\equiv CH$, R" and R''' are $CH_3$, X is

CH(α-OCOCH_3)]

EXAMPLE 21

17β-propyl-12α,17α-isopropylidenedioxy - 5β - androstan-3α-ol acetate [IV; R is $CH_2CH_2CH_3$, R" and R''' are $CH_3$, X is CH(α-OCOCH_3)]

To a solution of 1.1 g. (2.6 mmoles) of 17β-allyl-12α,17α-isopropylidenedioxy-5β-androstan-3α-ol acetate (Example 20) in 300 ml. of 95% ethanol was added 0.5 g. of 10% palladium on carbon and the resulting mixture shaken in 1 atmosphere of hydrogen until one molar equivalent was absorbed (2.5 minutes). The catalyst was removed by filtration through filtercel and the filtrate concentrated by warming in vacuo. The residue was taken up in ether and dried over powdered magnesium sulfate and concentrated to dryness. The residue was recrystallized from methanol to give 0.84 g. (76% yield) of 17β-propyl-12α,17α-isopropylidenedioxy - 5β - androstan-3α-ol acetate, M.P. 116–118° C. One recrystallization from methanol afforded a sample with the melting point unchanged, $[\alpha]_D$ +26.1°.

EXAMPLE 22

(a) 17α-hydroperoxy-3α,12α-dihydroxy-5β-pregnan-20-one

Oxygen gas was bubbled through a solution of 30.0 g. of potassium t-butoxide in 200 ml. of dry t-butanol (dried by distillation from calcium hydride) for 5 minutes at room temperature and then a solution of 6.0 g. (18 mmoles) of 3α,12α-dihydroxy-5β-pregnan-20-one in 60 ml. of dry t-butanol was added in one portion. Oxygen was bubbled through the resulting solution for 60 minutes and the reaction mixture was at once poured into 3 liters of water containing 60 ml. of acetic acid. The precipitate which formed was collected and dried to give 4.0 g. of 17α-hydroperoxy-3α,12α-dihydroxy - 5β - pregnan-20-one, M.P. 142–144° C. (dec.). Two recrystallizations from methanol afforded 1.0 g. of material, M.P. 150–152° C. (dec.), $[\alpha]_D$ +63.6° (1% in MeOH), $\lambda_{max}$ 2.80, 2.93, 3.16, 5.88, 11.53µ.

(b) 3α,12α,17α-trihydroxy-5β-pregnan-20-one

To a solution of 0.18 g. (0.49 mmole) of 17α-hydroperoxy-3α,12α-dihydroxy-5b-pregnan-20-one in 50 ml. of acetic acid was added 0.60 g. of acid-washed zinc dust and the mixture stirred for 4.5 hours at room temperature. The mixture was filtered, the zinc washed with methylene dichloride, and the filtrate concentrated to a small volume by warming in vacuum. The residue was dissolved in methylene dichloride and washed successively with saturated sodium bicarbonate solution, water and saturated salt solution and dried over powdered magnesium sulfate, then concentrated to dryness. The residue was recrystallized twice from acetone-hexane to give 75 mg. of 3α,12α,17α-trihydroxy-5β-pregnan-20-one, M.P. 190–192° C., $[\alpha]_D$ +77.1°.

(c) 3α-hydroxy-12α,17α-isopropylidenedioxy-5β-pregnan-20-one [VI; R" and R''' are $CH_3$, X is CH(α-OH)]

A solution of 1.76 g. (5.0 mmoles) of 3α,12α,17α-trihydroxy-5β-pregnan-20-one in 200 ml. of acetone containing 7 drops of 70% perchloric acid was kept at room temperature for 4 hours and then 100 ml. of water and 7 ml. of saturated sodium bicarbonate solution were added. The acetone was removed by warming in vacuum and the aqueous residue extracted with two portions of ether. The organic extracts were combined and washed with saturated salt solution and dried over powdered magnesium sulfate, then concentrated to dryness. The oily residue was chromatographed on 60 g. of silica gel and the material eluted with 10% methylene dichloride-50% ether-40% pentane was recrystallized from ether-pentane to give 0.92 g. (47% yield) of 3α-hydroxy-12α,17α-isopropylidenedioxy-5β-pregnan-20-one, M.P. 174–176° C., $[\alpha]_D$ +12.9°, $\lambda_{max}$ 2.84, 5.87μ.

By replacing the acetone in the foregoing preparation by a molar equivalent amount of methyl ethyl ketone or dibutyl ketone there can be obtained, respectively, 3α-hydroxy-12α,17α-(2'-butylidenedioxy)-5β-pregnan-20-one [VI; R" is $CH_3$, R'" is $C_2H_5$, X is CH(α-OH)] or 3α-hydroxy-12α,17α-(5'-nonylidenedioxy) - 5β - pregnan-20-one [VI; R" and R'" are $C_4H_9$, X is CH(α-OH)].

EXAMPLE 23

(a) 12α,17α-dihydroxy-5β-pregnane-3,20-dione

Oxidation of 3α,12α,17α-trihydroxy-5β-pregnan-20-one with N-bromoacetamide in tertiary-butanol solution containing traces of pyridine and water, afforded 12α,17α-dihydroxy-5β-pregnane-3,20-dione in 61% yield, M.P. 210–211° C.

(b) 12α,17α-isopropylidenedioxy-5β-pregnane-3,20-dione [VI; R" and R'" are $CH_3$, X is C=O]

A solution of 4.0 g. (11.5 mmoles) of 12α,17α-dihydroxy-5β-pregnane-3,20-dione in 400 ml. of acetone containing 40 drops of 70% perchloric acid was kept at room temperature for three hours. Water (200 ml.) and 50 ml. of saturated sodium bicarbonate solution were added and the acetone was removed by warming in vacuum. The aqueous residue was extracted with ether and the organic extract washed with salt solution and dried over powdered magnesium sulfate, then concentrated to dryness. The clear, oily residue was dissolved in 50 ml. of ether and 450 ml. of pentane was added. A precipitate formed which was collected and recrystallized from ethyl acetate to give 0.67 g. of 12α,17α-dihydroxy-5β-pregnane-3,20-dione, M.P. 204–209° C. The ether-pentane filtrate was poured onto a column containing 150 g. of silica gel and the column eluted with a 1:4 ether-pentane mixture. The product thus eluted from the column was recrystallized from pentane to give 1.44 g. (39% yield) of 12α,17α-isopropylidenedioxy - 5β - pregnane - 3,20 - dione, M.P. 135–136.5° C., $[\alpha]_D$ +15.0°, $\lambda_{max}$ 5.82μ.

EXAMPLE 24

3α-hydroxy-12α-isopropoxy-5β-androstan-17-one [VII; R" and R'" are $CH_3$, Z' is C=O, X is CH(α-OH)]

A suspension of 9.7 g. (31.3 mmoles) of 5β-androstane-13α,12α,17β-triol in 600 ml. of acetone was treated with 12 ml. of boron trifluoride etherate, and the solid dissolved in about ten minutes. The solution was kept for 2 hours at room temperature and then poured into 300 ml. of saturated sodium bicarbonate diluted with 300 ml. of water. The acetone was removed by warming in vacuum and the aqueous residue extracted with 600 ml. of ether. The layers were separated and the organic layer washed with water and saturated salt solution and dried over powdered magnesium sulfate, then concentrated to dryness. Recrystallization of the residue from ether-pentane gave 5.85 g. of 3α-hydroxy-12α-isopropoxy-5β-androstan-17-one, M.P. 138–148° C. Two further recrystallizations from ether-pentane afforded 3.5 g. of material which melted at 148–150° C. Recrystallization from acetonitrile gave a sample with M.P. 150.5–152° C., $[\alpha]_D$ +172.0°, $\lambda_{max}$ 2.86, 5.76μ; NMR two t-$CH_3$, 1.28 and 1.43 p.p.m.; two sec-$CH_3$, 1.58 and 1.62 p.p.m. (J=7 c.p.s.).

By replacing the acetone in the foregoing preparation by a molar equivalent amount of ethyl methyl ketone or dibutyl ketone, there can be obtained, respectively, 3α-hydroxy-12α-(2'-butyloxy)-5β-androstan-17-one [VII; R" is $C_2H_5$, R'" is $CH_3$, Z' is C=O, X is CH(α-OH)], or 3α-hydroxy-12α-(5'-nonyloxy)-5β-androstan-17-one [VII; R" and R'" are $C_4H_9$, Z' is C=O, X is CH(α-OH)].

EXAMPLE 25

12α-isopropoxy-5β-androstane-3α,17β-diol [VII; R" and R'" are $CH_3$, Z' is CH(β-OH), X is CH(α-OH)]

To a stirred suspension of 3.0 g. of lithium aluminum hydride in 300 ml. of tetrahydrofuran was added dropwise a solution of 3.0 g. (8.6 mmoles) of 3α-hydroxy-12α-isopropoxy-5β-androstan-17-one (Example 24) in 300 ml. of tetrahydrofuran and the mixture heated under reflux for 18 hours. The excess hydride was decomposed by careful addition of 6 ml. of water, the mixture filtered through Celite and the precipitate washed with tetrahydrofuran. The filtrate was concentrated to dryness and the residue crystallized from ether-pentane to furnish 2.2 g. (73% yield) of 12α-isopropoxy-5β-androstane-3α,17β-diol, M.P. 177–178° C. One further recrystallization from ether-pentane afforded a sample with M.P. 178–180° C., $[\alpha]_D$ +78.7°.

EXAMPLE 26

12α-isopropoxy-5β-androstane-3,17-dione [VII; R" and R'" are $CH_3$, Z' and X are C=O]

A solution of 36.0 g. (0.103 mole) of 3α-hydroxy-12α-isopropoxy-5β-androstan-17-one (Example 24) in 600 ml. of t-butanol containing 25 ml. of water, 25 ml. of pyridine and 17.8 g. (1.20 equiv.) of N-bromoacetamide was kept overnight at room temperature in the dark and then poured into 4 liters of cold water containing 36 g. of sodium sulfite. The aqueous mixture was extracted with three 1-liter portions of methylene dichloride and the combined extracts washed with dilute hydrochloric acid, dilute sodium hydroxide, water and saturated salt solution and dried over powdered magnesium sulfate, then concentrated to dryness. Crystallization of the residue from methylene dichloride-ether-pentane afforded 16.3 g. of 12α-isopropxy-5β-androstane-3,17-dione, M.P. 112.5–115° C. A 3.0 g. portion was recrystallized once from ether-pentane to give 2.1 of pure material, M.P. 113–115° C., $[\alpha]_D$ +163.5°. An additional 11.7 g. (77% total yield) of product, M.P. 113–116° C., was obtained by saturation of the above aqueous layer with ammonium sulfate, re-extraction with methylene dichloride, combination of this extracted material with that from the two recrystallization mother liquors and purification by chromatography on silica gel.

EXAMPLE 27

12α-isopropoxyandrost-4-ene-3,17-dione [VIII; R" and R'" are $CH_3$, Z' is C=O]

To a stirred solution of 25.5 g. (73.5 mmoles) of 12α-isopropoxy-5β-androstane-3,17-dione (Example 26) in 150 ml. of acetic acid containing one drop of 30% hydrogen bromide in acetic acid was added dropwise 11.75 g. (1 equiv.) of bromine in 150 ml. of acetic acid. The reaction mixture was at once poured into 2 liters of water and the bulk of the acid neutralized by adding about 1.5 liter of 10% sodium carbonate solution. Ether was added, the layers separated, and the organic layer washed with water, saturated sodium bicarbonate solution and saturated salt solution and dried over powdered magnesium sulfate, then concentrated to dryness. The brown, viscous, oily 4β-bromo derivative (34 g.), thus obtained, was used without further purification. The oil was dissolved in 250 ml. of dimethylformamide and stirred with 22 g. of lithium carbonate and 25 g. of lithium bromide for 18 hours with heating on a steam bath. Ether and water were added and the layers were separated. The ether layer was washed with water and saturated salt solution and dried over powdered magnesium sulfate, then concentrated to dryness. The residue was recrystallized twice from methanol to furnish 11.0 g. (43% yield) of 12α-isopropoxyandrost-4- ene-3,17-dione, M.P. 161–162° C. One further recrystallization from the same solvent afforded a sample with M.P. 162–164° C., $[\alpha]_D$ +222.1°; $\lambda_{max}$ 240 m$\mu$ ($\epsilon$ 16,200).

EXAMPLE 28

17$\beta$-hydroxy-12$\alpha$-isopropoxyandrost-4-en-3-one [VIII; R'' and R''' are CH$_3$, Z' is CH($\beta$-OH)]

To a stirred suspension of 3.45 g. of lithium aluminum hydride in 300 ml. of tetrahydrofuran was added dropwise a solution of 3.45 g. (10.0 mmoles) of 12$\alpha$-isopropoxyandrost-4-ene-3,17-dione (Example 27) in 300 ml. of tetrahydrofuran and the mixture heated under reflux for 18 hours. Water (7 ml.) was added cautiously and the precipitate removed by filtration through Celite and washed with tetrahydrofuran. The combined filtrate and washings were concentrated to dryness to furnish a white, crystalline residue which was dissolved in 50 ml. of dioxane and treated with 3.0 g. (13 mmoles) of 2,3-dichloro-5,6-dicyanoquinone. The resulting solution was stirred for three hours at room temperature and the precipitate which formed during that time was collected and washed with dioxane. The filtrate and washings were combined and concentrated in vacuum at <50° C. and the residue dissolved in methylene dichloride and washed with 2 N sodium hydroxide and water and dried over powdered magnesium sulfate, then concentrated to dryness. The red, oily residue was crystallized from ether-pentane to produce 2.2 g. of material, M.P. 94–99° C. Two further recrystallizations from the same solvent mixture afforded 1.57 g. (45% yield) of 17$\beta$-hydroxy-12$\alpha$-isopropoxyandrost-4-en-3-one, M.P. 93–96° C., $[\alpha]_D$ +125.8°; $\lambda_{max}$ 243 m$\mu$ ($\epsilon$ 14,800); $\lambda_{max}$ 3.00 (OH at C–17), 5.96 (conjugated CO at C–3), 6.19$\mu$ (C=C).

17$\beta$-hydroxy-12$\alpha$-isopropoxyandrost-4-en-3-one can be oxidized with aluminum isopropoxide and acetone in benzene solution, heating for about twelve hours, to give 12$\alpha$-isopropoxyandrost-4-ene-3,17-dione.

EXAMPLE 29

(a) 12$\alpha$,17$\beta$-dihydroxyandrost-4-en-3-one 17-trifluoroacetate [X; R''' is COCF$_3$, Z is CH($\alpha$-OH)]

A solution of 8.0 g. (23.2 mmoles) of 12$\alpha$-isopropoxyandrost-4-ene-3,17-dione (Example 27) in 50 ml. of trifluoroacetic acid was kept for 22 hours at room temperature and then poured into 250 ml. of 10% sodium carbonate solution. Additional sodium carbonate solution was added until the mixture was alkaline, ether was added and the layers were separated. The ether layer was washed with saturated salt solution and dried over powdered magnesium sulfate, then concentrated to dryness. The sticky crystalline residue was recrystallized twice from methylene dichloride-ether to furnish 2.50 g. of 12$\alpha$,17$\beta$-dihydroxyandrost-4-en-3-one 17-trifluoroacetate, M.P. 213–216° C. Recrystallization from acetonitrile gave a sample with M.P. 218–219° C., $[\alpha]_D$ +58.9°; $\lambda_{max}$ 241 m$\mu$ ($\epsilon$ 16,500); $\lambda_{max}$ 2.94 (OH at C–12), 5.60 (OCOCF$_3$ at C–17), 6.01$\mu$ (conjugated CO at C–3).

(b) 12$\alpha$,17$\beta$-dihydroxyandrost-4-en-3-one [X; R''' is H, Z is CH($\alpha$-OH)]

All mother liquors from part (a) were combined and concentrated to dryness to give 7.5 g. of an oil which was dissolved in 500 ml. of methanol, treated with 10 g. of potassium hydroxide in 25 ml. of water and heated under reflux for 30 minutes. The solvents were removed by warming in vacuum and the residue partitioned between 500 ml. of methylene dichloride and 60 ml. of water. The organic layer was separated and washed with water and saturated salt solution and dried over powdered magnesium sulfate and concentrated to give 5.2 g. of a brown oil which was chromatographed on silica gel. Elution with 1:9 methylene dichloride-ether afforded 0.65 g. of residue which was recrystallized from methanol to furnish 0.40 g. of 12$\alpha$-isopropoxyandrost-4-ene-3,17-dione, M.P. 159–163° C. Elution with 1:9 methanol-ether afforded, after two recrystallizations from ethyl acetate, 2.03 g. of 12$\alpha$,17$\beta$-dihydroxyandrost-4-en-3-one, M.P. 148–150° C. One further recrystallization from the same solvent furnished a sample with M.P. 150–152° C., $[\alpha]_D$ +129.1°; $\lambda_{max}$ 241 m$\mu$ ($\epsilon$ 16,300); $\lambda_{max}$ 2.94 (OH at C–12 and C–17), 6.04 (conjugated CO at C–3), 6.21$\mu$ (C=C).

12$\alpha$,17$\beta$-dihydroxyandrost-4-en-3-one can be esterified with trifluoroacetic acid at room temperature to give the 17-trifluoroacetate.

12$\alpha$,17$\beta$-dihydroxyandrost-4-en-3-one can be oxidized with chromic oxide in acetic acid to give 4-androstene-3,12,17-trione.

EXAMPLE 30

12$\alpha$,17$\beta$-dihydroxyandrost-4-en-3-one diacetate [X; R''' is COCH$_3$, Z is CH($\alpha$-OCOCH$_3$)]

(A) From 12$\alpha$,17$\beta$-dihydroxyandrost-4-en-3-one.—A 0.90 g. sample of 12$\alpha$,17$\beta$-dihydroxyandrost-4-en-3-one (Example 29) was acetylated with acetic anhydride and pyridine and the product recrystallized from ether-pentane to give 0.67 g. of 12$\alpha$,17$\beta$-dihydroxyandrost-4-en-3-one diacetate, M.P. 192–195° C., and undepressed upon admixture with a sample, M.P. 191–194° C., prepared below; the infrared spectra of the two samples were identical.

(B) From 12$\alpha$-hydroxyandrost-4-ene-3,17-dione.—A solution of 1.70 g. (5.62 mmoles) of 12$\alpha$-hydroxyandrost-4-ene-3,17-dione in 175 ml. of tetrahydrofuran was added dropwise to a stirred suspension of 1.70 g. of lithium aluminum hydride in 175 ml. of tetrahydrofuran and the mixture heated under reflux for 5 hours. Water (3.5 ml.) was added dropwise, the insoluble material removed by filtration through Celite and the filtrate concentrated to dryness. The viscous, oily residue was dissolved in 25 ml. of dioxan, treated with 1.65 g. (7.3 mmoles) of 2,3-dichloro-5,6-dicyanoquinone and stirred for 2 hours at room temperature. The precipitate which had formed was removed by filtration and washed with several portions of dioxan and the combined filtrate and washings concentrated to dryness. The residue was dissolved in methylene dichloride and washed with 2 N sodium hydroxide and water and dried over powdered magnesium sulfate, then evaporated to dryness and the oily residue chromatographed on silica gel. Elution with 5% methanol in ether afforded 0.93 g. of oil which was shown by thin layer chromatography (1:9 methanol-ether) to be mainly 12$\alpha$,17$\beta$-dihydroxyandrost-4-en-3-one, but which could not be induced to crystallize from ethyl acetate. Acetylation of the crude oil with acetic anhydride and pyridine and purification of the product by recrystallization from methylene dichloride-ether-pentane gave 0.60 g. of 12$\alpha$,17$\beta$-dihydroxyandrost-4-en-3-one diacetate, M.P. 191–194° C. Recrystallization from acetone-hexane gave a sample with M.P. 194–196° C.; $[\alpha]_D$ +130.2° $\lambda_{max}$ 240 m$\mu$ ($\epsilon$ 17,300); $\lambda_{max}$ 5.73, 5.77 and 7.92 (OCOCH$_3$ at C–12 and C–17, 6.00 (conjugated CO at C–3), 6.19$\mu$ (C=C).

12$\alpha$,17$\beta$-dihydroxyandrost-4-en-3-one diacetate can be saponified with potassium hydroxide in methanol solution to give 12$\alpha$,17$\beta$-dihydroxyandrost-4-en-3-one (Example 29).

EXAMPLE 31

17$\beta$-hydroxyandrost-4-ene-3,12-dione trifluoroacetate [X; R''' is COCH$_3$, Z is C=O]

A solution of 1.33 g. (3.3 mmoles) of 12$\alpha$,17$\beta$-dihydroxyandrost-4-en-3-one 17-trifluoroacetate (Example 29) in 8 ml. of pyridine was added to 2.36 g. of chromium trioxide in 25 ml. of pyridine. The mixture was kept overnight at room temperature, diluted with hot benzene, filtered through Celite and the filter cake rinsed with two portions of hot benzene. The filtrate and washes were combined, diluted with ether and washed with water, 2 N hydrochloric acid, 2 N sodium hydroxide, water and saturated salt solution and dried over powdered magnesium sulfate, then concentrated to dryness to give about 0.5 g. of white, crystalline residue. The aqueous washes were re-extracted with methylene dichloride to furnish an additional 0.33 g. of crystalline material. Chromatography of the total product on silica gel and elution with 20% methylene dichloride-25% ether-55% pentane afforded (after recrystallization from acetone-hexane) 0.25 g. of 17β-hydroxyandrost-4-ene-3,12-dione trifluoroacetate, M.P. 216–218° C., [α]$_D$ +141.0°; λ$_{max}$ 238 mμ (ε 16,700); λ$_{max}$ 5.65 (OCOCF$_3$ at C–17), 5.88 (CO at C–12), 5.96 (conjugated CO at C–3), 6.19μ (C=C).

17β-hydroxyandrost-4-ene-3,12-dione trifluoroacetate can be hydrolyzed with potassium hydroxide in methanol to give 17β-hydroxy-4-androstene-3,12-dione, which in turn can be oxidized with chromic oxide in acetic acid to give 4-androstene-3,12,17-trione.

I claim:
1. A compound of the formula

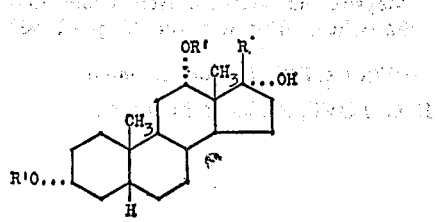

wherein R is lower-alkyl, lower alkenyl or lower-alkynyl; and R' is hydrogen or carboxylic acyl having up to twelve carbon atoms.

2. 17β-lower-alkyl-5β-androstane-3α,12α,17α-triol or a 3,12-di-lower-carboxylic acid ester thereof.

3. 17β-allyl-5β-androstane-3α,12α17α-triol or a 3,12-di-lower-carboxylic acid ester thereof.

4. A compound of the formula

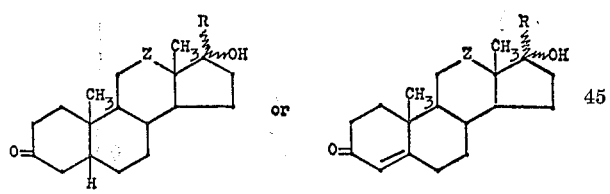

wherein R is lower-alkyl, lower-alkenyl or lower-alkynyl; and Z is CH(α-OH), CH(α-OAcyl) or C=O, Acyl being carboxylic acyl having up to twelve carbon atoms.

5. 17-lower-alkyl-12α,17-dihydroxy-5β-androstan-3-one.

6. 17-lower-alkyl-12α,17-dihydroxy-4-androsten-3-one.

7. A compound of the formula

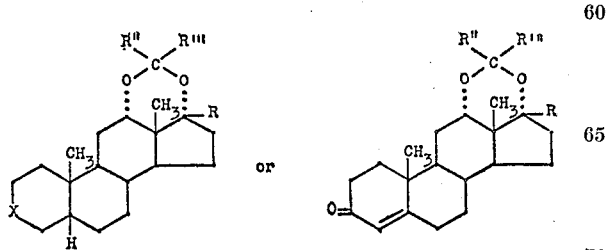

wherein X is CH(α-OH), CH(α-OAcyl) or C=O, Acyl being carboxylic acyl having up to twelve carbon atoms; R is lower-alkyl, lower-alkenyl or lower-alkynyl; and R" and R'" are lower-alkyl.

8. 17β-lower-alkyl-12α,17α-isopropylidenedioxy-5β-androstan-3α-ol or a 3-lower-carboxylic acid ester thereof.

9. 12α,17α-isopropylidenedioxyl-17β-methylandrost-4-en-3-one.

10. A compound of the formula

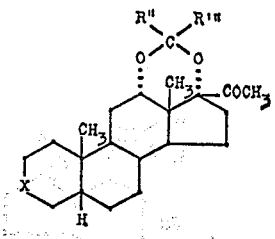

wherein X is CH(α-OH), or CH(α-OAcyl), Acyl being carboxylic acyl having up to twelve carbon atoms; and R" and R'" are lower-alkyl.

11. 17α-hdroperoxy-3α,12α-dihydroxy-5β-pregnan-20-one.

12. 17-methyl-5β-androst-16-ene-3α,12α-diol or a 3,12-di-lower-carboxylic acid ester thereof.

13. A compound of the formula

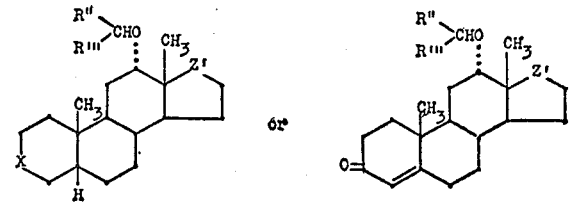

wherein X is CH(α-OH), CH(α-OAcyl) or C=O; Z' is CH(β-OH), CH(β-OAcyl) or C=O; and R" and R'" are lower-alkyl; Acyl in each instance being carboxylic acyl having up to twelve carbon atoms.

14. The process for preparing a compound of the formula

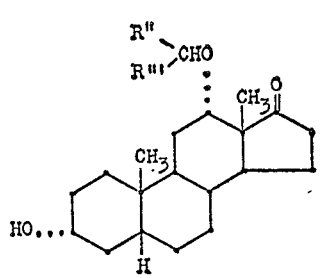

wherein R" and R'" are lower-alkyl, which comprises reacting 5β-androstane-3α,12α,17β-triol with a ketone, R"COR'", in the presence of a strong acid catalyst.

15. A compound of the formula

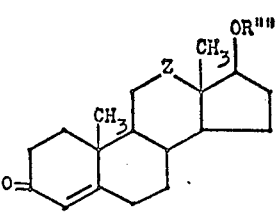

wherein R"" is hydrogen or carboxylic acyl having up to twelve carbon atoms; and Z is CH(α-OH), CH(α-OAcyl) or C=O, Acyl being carboxylic acyl having up to twelve carbon atoms.

16. A compound according to claim 15 wherein R'''' is trifluoroacetyl.

17. 12α,17β-dihydroxy-4-androsten-3-one.

18. 12α,17β-diacetoxy-4-androsten-3-one.

19. The process for preparing 4-androstene-12α,17β-diol-3-one which comprises treating with a strong acid a compound of the formula

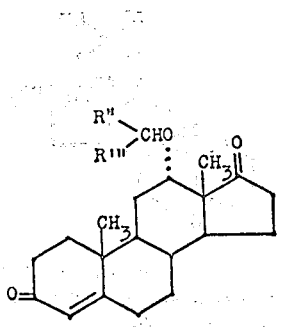

wherein R'' and R''' are lower-alkyl.

20. The process for preparing 17β-trifluoroacetoxy-4-androsten-12α-ol-3-one which comprises treating with trifluoroacetic acid a compound of the formula

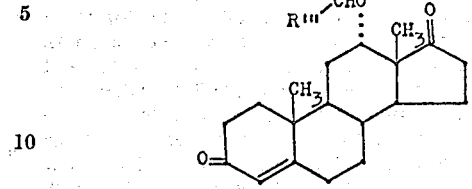

wherein R'' and R''' are lower-alkyl.

References Cited

UNITED STATES PATENTS

| | | | |
|---|---|---|---|
| 3,141,017 | 7/1964 | Diassi | 260—239.55 |
| 3,030,391 | 4/1962 | Diassi | 260—397.45 |

OTHER REFERENCES

Meystre and Wettstein, Helv. Chim. Acta 32, pp. 1978–1992 (Chem. Abstracts, vol. 45, p. 4256d).

LEWIS GOTTS, *Primary Examiner.*

E. G. LOVE, *Assistant Examiner.*

UNITED STATES PATENT OFFICE
CERTIFICATE OF CORRECTION

Patent No. 3,405,127                                              October 8, 1968

Philip E. Shaw

It is certified that error appears in the above identified patent and that said Letters Patent are hereby corrected as shown below:

Column 1, line 44, below the formula insert -- I --. Column 3, line 13, below the right-hand formula insert -- V --; line 48 "is tertiary-" should read -- in tertiary- --; line 50, "17a-" should read -- 17α- --. Column 9, line 55, "β=CH$_2$≡CH" should read -- β-CH$_2$C≡CH --. Column 10, line 13, "3a" should read -- 3α --; same line 13, "CR$_3$" should read -- CH$_3$ --. Column 12, line 54, "5b-" should read -- 5β- --. Column 13, line 55, "13α,12α,17β-" should read -- 3α,12α,17β- --. Column 14, line 42, "2.1" should read -- 2.1 g. --; line 75, "12a-" should read -- 12α- --. Column 18, line 4, "-isopropylidenedioxyl-" should read -- -isopropylidenedioxy- --; line 22, "hdroperoxy-" should read -- hydroperoxy- --.

Signed and sealed this 24th day of February 1970.

(SEAL)
Attest:

EDWARD M. FLETCHER, JR.                           WILLIAM E. SCHUYLER, JR.
Attesting Officer                                 Commissioner of Patents